(12) United States Patent
Andreasen

(10) Patent No.: US 7,899,040 B2
(45) Date of Patent: Mar. 1, 2011

(54) SYNCHRONIZATION OF EVENT PROCESSING AT A MEDIA GATEWAY

(75) Inventor: Flemming Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 503 days.

(21) Appl. No.: 11/376,657

(22) Filed: Mar. 15, 2006

(65) Prior Publication Data

US 2007/0220082 A1  Sep. 20, 2007

(51) Int. Cl.
*H04L 12/66* (2006.01)
(52) U.S. Cl. ............... 370/356; 379/88.17; 709/203
(58) Field of Classification Search ............... 370/352, 370/356; 379/27.02, 88.17; 713/168; 709/203
See application file for complete search history.

(56) References Cited

U.S. PATENT DOCUMENTS

| | | | |
|---|---|---|---|
| 6,188,760 B1 * | 2/2001 | Oran et al. | 379/230 |
| 2001/0055382 A1 * | 12/2001 | Oran et al. | 379/229 |
| 2004/0008824 A1 * | 1/2004 | Resuta | 379/27.02 |
| 2005/0266859 A1 * | 12/2005 | Tejani et al. | 455/456.4 |
| 2006/0013195 A1 * | 1/2006 | Son et al. | 370/352 |

FOREIGN PATENT DOCUMENTS

EP  1511282 A1  3/2005

OTHER PUBLICATIONS

Andreasen, F., and Foster, B., "Media Gateway Control Protocol (MGCP)) Version 1.0," RFC 3435 (Jan. 2003).

"Interworking of Cisco MGCP Voice Gateways and Cisco CallManager Verson 3.1," Cisco Systems, (Jan. 14, 2003).

Dang, L., Jennings, C., and Kelly, D., "Pratical VoIP Using Vocal," (O'Reilly Media, Inc.), pp. 43, 121-122, 253-254, 330, 383-384 (Jul. 2002).

Lin, Yangbo, and Zhong, Luo, "A Proposal to Introduce an Efficient Mechanism for EventBuffer Processing," International Telecommunication Union, ITU-T Draft Study Period 2005-2008, Study Group 16, pp. 1-3, (Nov. 16, 2004).

Lin, Yangbo, and Zhong, Luo, "A Rule-based Method for Higher H.248 EventBuffer Processing Efficiency," International Telecommunication Union, ITU-T Draft Study Period 2005-2008, Study Group 16, pp. 1-3, (Nov. 16, 2004).

European Search Report issued in European Patent Application No. 07751899.1, dated Sep. 14, 2009, 7 pages.

* cited by examiner

*Primary Examiner*—Fan Tsang
*Assistant Examiner*—Simon King
(74) *Attorney, Agent, or Firm*—Hamilton, Brook, Smith & Reynolds, P.C.

(57) ABSTRACT

A method and apparatus of communication processing at a client (e.g., media gateway) connected to a server (e.g., media gateway controller) includes collecting events in a quarantine buffer. The contents of the buffer are examined to determine whether the collected events include one or more synchronizing events. An instruction signal sent to the client from the server includes information defining one or more events as a synchronizing event. If one or more synchronizing events is present, the collected events are processed from the buffer relative to the one or more synchronizing events. The processing may include processing the collected events beginning after the most recent or second most recent synchronizing event. The collected events that occurred up to the most recent or second most recent synchronizing event may be moved to a synchronized event list. The synchronized event list may be reported to the server or discarded.

19 Claims, 4 Drawing Sheets

SYNCHRONIZATION OF EVENT PROCESSING AT A MEDIA GATEWAY

BACKGROUND

In packet telephony or Voice over Internet Protocol (VoIP) networks, there are several protocol stacks that have been defined to facilitate the provision of voice, video and other messaging services. These protocol stacks include H.323, Session Initiation Protocol (SIP), Media Gateway Control Protocol (MGCP) and others.

H.323 is a standardized communication protocol that enables dissimilar devices to communicate with each other using a common set of codecs, call setup and negotiating procedures, and basic data transport methods.

The MGCP protocol, defined under Informational RFC 3435 (F. Andreasen, B. Foster, "Media Gateway Control Protocol (MGCP) Version 1.0", RFC 3435, January 2003), incorporated herein in its entirety, is suited for centralized systems controlling IP telephony gateways that operate with endpoints having little or no intelligence, such as analog telephones. MGCP is a plain-text, master/slave protocol that allows call control devices, also referred to as call agents, media gateway controllers or more generally as servers, to take control of a specific port on a gateway or on an MGCP-controlled IP phone, also referred to more generally as a client or MGCP endpoint. MGCP messages between call agents and MGCP endpoints are sent with Internet Protocol over User Datagram Protocol (IP/UDP). No voice data is transmitted through the MGCP protocol itself. Rather, all the voice data transfer occurs directly between the gateways.

PacketCable is an industry-wide initiative for developing interoperability standards for multimedia services over cable facilities using packet technology. PacketCable developed protocols called Network-based Call Signaling (NCS) and Trunking Gateway Control Protocol (TGCP), which both contain extensions and modifications to MGCP while preserving basic MGCP architecture and constructs. NCS is designed for use with analog, single or multi-line user equipment on residential gateways, while TGCP is intended for use in VoIP-to-PSTN trunking gateways in a cable environment. Hereinafter, references to MGCP are defined to include NCS/TGCP unless otherwise noted.

The media gateway collects events (e.g., on-hook, off-hook, flash-hook, digit input) in a quarantine buffer according to a list of requested events communicated to the gateway by the media gateway controller using a NotificationRequest (RQNT) command. After notifying a list of events to the media gateway controller, the gateway awaits a response, and possibly a new request for event collection from the media gateway controller. Once the response, and possibly a new event collection request, has been received by the gateway, the events in the quarantine buffer are processed first, followed by any other events that may occur subsequently.

During periods of network congestion, media gateway controller overload, loss of connectivity to the media gateway controller, or other interruptions in the communication between gateway and media gateway controller, it is possible for the quarantine buffer to collect a large number of events. Several of these events may contain real-time state information that may not be of interest at a later time. However, due to the first-in-first-out nature of the quarantine buffer, currently defined mechanisms only allow either all buffered events to be processed (in order) or all buffered events to be discarded.

Consider the example of a gateway connected to a telephone where the user picks up the handset and expects to hear a dial tone. In a scenario in which there is network congestion, media gateway controller overload, or loss of network connectivity, the user may not hear dial tone and consequently will hang up the handset. This user activity generates both an off-hook and an on-hook. Since the user did not hear dial tone, the user may repeat the sequence. When the media gateway controller regains connectivity with the gateway, first-in-first-out processing of such "stale" events likely will lead to undesirable behavior and further delays, e.g., dial tone being turned on and off repeatedly to the user.

As noted above, the currently defined mechanisms for handling this problem are crude inasmuch as they only allow for either clearing or processing the entire quarantine buffer. One difficulty with the known approach is that the media gateway controller may not realize that the gateway has collected events which for all practical purposes are stale, and hence it does not know to ask the gateway to discard such events. Another difficulty is that in cases where the media gateway controller has reason to suspect that the gateway may have stale events in the quarantine buffer, it can instruct the gateway to discard all events, but in so doing, events that are not stale may also be discarded.

BRIEF DESCRIPTION OF THE DRAWINGS

The invention will be apparent from the following description of embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The present approach is directed to a mechanism that provides for improved communication and event processing at clients in a packet telephony network environment. The servers may be media gateway controllers and the clients may be gateways or MGCP-controlled IP phones.

In accordance with the present approach, "synchronizing events" are events that are preferably defined by the server to provide a synchronization point for event processing.

In an embodiment, a method of communication processing at a client (e.g., media gateway) connected to a server (e.g., media gateway controller or call agent) includes collecting events in a quarantine buffer. The contents of the buffer are examined to determine whether the collected events include one or more synchronizing events. If one or more synchronizing events is present, the collected events are processed from the buffer relative to the one or more synchronizing events. In an embodiment, the processing may include processing the collected events beginning after the most recent or second most recent synchronizing event. In other embodiments, the processing may include processing collected events beginning with the $n^{th}$ latest synchronizing event. The collected events that occurred up to the most recent or second most recent synchronizing event may be moved to a synchronized event list. The synchronized event list may be reported to the server or discarded.

In an embodiment, an instruction signal sent to the client from the server includes information defining one or more events as a synchronizing event. In one embodiment, the instruction signals comply with proper message handling in accordance with RFC 3435. For example, the instruction signal may be according to an MGCP RQNT format modified to include parameters that define synchronizing events. The synchronizing events may include on-hook events, off-hook events, flash-hook events and buffer overflow events.

An advantage of the present approach is that a gateway can bypass or discard processing of stale events without losing current events, i.e., events that are of interest, thereby significantly reducing overall processing and messaging while providing quality service to the gateway endpoint and user. By avoiding the processing of stale events at the gateway, the media gateway controller in turn avoids acting on the stale events and potentially issuing stale commands in response (e.g., turning dial tone on and off repeatedly). With the present approach, the media gateway controller can indicate dynamically to the gateway which events are considered synchronizing. Thus, the dynamic definition mechanism is flexible to be used with any current and future defined event types.

Figure 1:
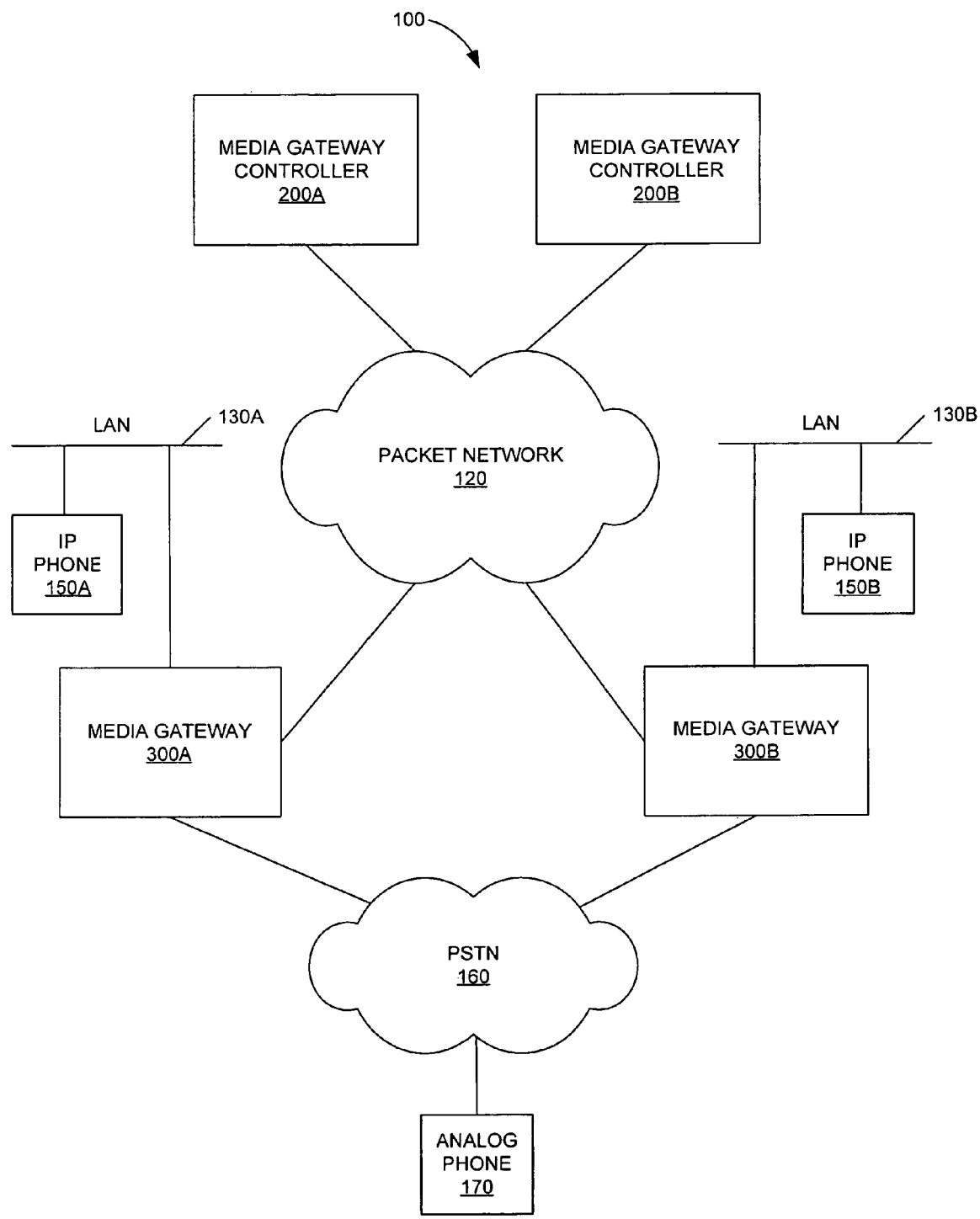
FIG. 1 is a block diagram of an exemplary network configuration that may be used with the present approach.

FIG. 1 is a high-level block diagram of an exemplary network configuration 100 that may implement the present approach. The network configuration includes media gateway controllers 200A, 200B and media gateways 300A, 300B coupled to packet network 120. The gateways 300A, 300B are coupled to IP phones 150A, 150B, respectively, through respective local area networks (LANs) 130A, 130B. The gateways 300A, 300B are also coupled to public switched telephone network (PSTN) 160. Analog phone 170 is coupled to the PSTN 160.

The packet network 120 may be implemented as a LAN, wide area network (WAN), global distributed network such as the Internet, Intranet, Extranet or any other form of wireline or wireless communication network. Generally, the network 120 may include any number and combination of routers, hubs, switches, gateways, media gateway controllers, endpoints, or other hardware and software, for the communication of packets or other portions of information and control between network components (e.g., media gateway controllers, IP phones, MGCP gateways).

In a particular embodiment, network 120 employs voice communication protocols that allow for the addressing or identification of network components coupled to the network 120. For example, using Internet protocol (IP), each of the components coupled together by communication network 120 may be identified in information directed using IP addresses. In this manner, network 120 may support any form and/or combination of point-to-point, multicast, unicast, or other techniques for exchanging media packets among components in communication system 100. Any network components capable of exchanging audio, video, or other data using frames or packets, are included within the scope of the present approach.

Packet network 120 may be directly coupled to other IP networks including, but not limited to, another LAN, or the Internet. In addition to being coupled to other IP networks, network 120 may also be coupled to non-IP telecommunication networks through the use of interfaces or components, for example gateways 300A, 300B. In the illustrated embodiment, packet network 120 is coupled with PSTN 160 through gateways 300A, 300B. PSTN 160 may include switches, central offices, mobile telephone switching offices, pager switching offices, remote terminals, and other related telecommunications equipment.

Technology that allows telecommunications to be transmitted over an IP network may comprise Voice over IP (VoIP), or simply Voice over Packet (Vop). In the illustrated embodiment, IP phones 150A, 150B and gateways 300A, 300B are IP telephony devices. IP telephony devices have the ability of encapsulating a user's voice information (or other input) into IP packets so that the voice can be transmitted over network 120. IP telephony devices may include telephones, fax machines, computers running telephony software, nodes, gateways, or any other devices capable of performing telephony functions over an IP network. The media gateway controllers 200A, 200B may communicate with the MGCP gateways 300A, 300B using MGCP messaging to control the transfer of voice packets between devices. This allows users of IP phones 150A, 150B and analog phone 170 to communicate with each other.

Although FIG. 1 illustrates a particular number and configuration of media gateway controllers, gateways, IP phones and analog phones, the communication system 100 contemplates any number or arrangement of such components for communicating media. In addition, the system 100 contemplates arrangements that operate based on NCS for packet cable configurations using media termination adapters (MTAs), TGCP for trunking gateways, and Megaco/H.248 for either.

Figure 2:
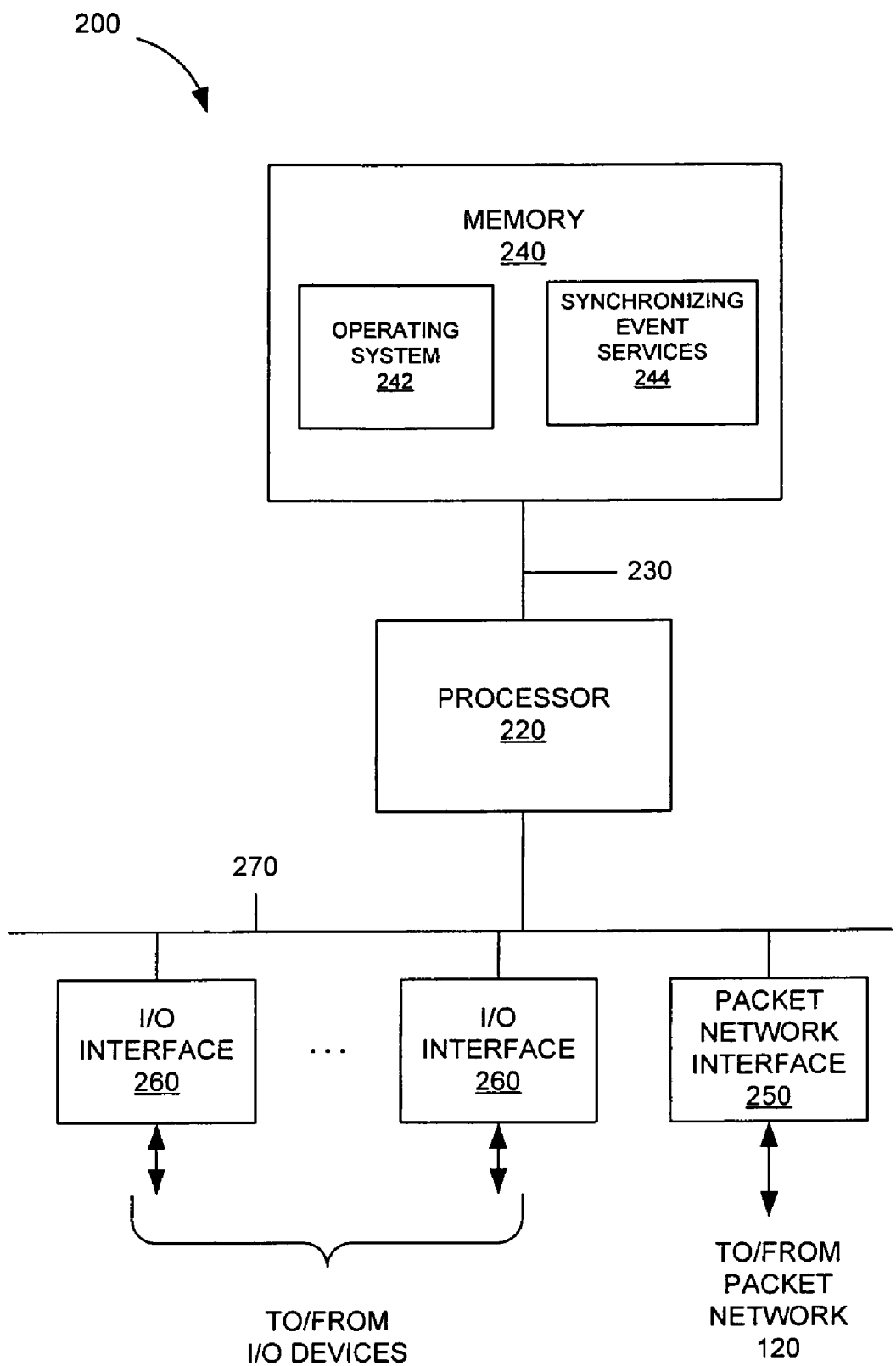
FIG. 2 is a block diagram of a media gateway controller that may be used with the present approach.

FIG. 2 illustrates a high-level partial schematic block diagram of an embodiment of a media gateway controller 200. The media gateway controller 200 comprises a processor 220, memory 240 coupled to the processor 220 via memory bus 230, packet network interface module 250 and I/O interface modules 260 coupled to the processor 220 via I/O bus 270. The media gateway controller 200 is configured to handle various call control functions associated with VoIP calls (e.g., made in packet network 120 shown in FIG. 1).

The processor 220 is a conventional central processing unit (CPU) configured to execute computer-executable instructions contained in memory 240 including instructions that implement aspects of the present invention. The I/O interfaces 260 are conventional I/O device interfaces that interface the processor 220 with various I/O devices, such as display units, keyboards, disk units and the like. The packet network interface 250 is a conventional network interface (e.g., a network interface card) that interfaces the media gateway controller 200 with the network 120, enabling data packets to be transferred between the media gateway controller 200 and the network 120, and supports various protocols, such as VoIP protocols including MGCP. To that end, interface 250 comprises conventional interface circuitry that incorporates signal, electrical and mechanical characteristics, and interchange circuits, needed to interface with the physical media of the network 120 and protocols running over that media.

Memory 240 is a computer-readable medium organized as random access memory (RAM) and implemented using various RAM devices, such as dynamic random access memory (DRAM) devices. The memory is configured to hold various computer executable instructions and data structures including computer executable instructions and data structures that implement aspects of the present approach. It should be noted that other computer readable mediums, such as disk units and flash memory, may be configured to hold computer readable instructions and data that implement aspects of the present approach. In addition, it should be noted that various electromagnetic signals may be encoded to carry instructions and data that implement aspects of the present approach on a data network.

Memory 240 includes an operating system 242 and synchronizing event services module 244. The operating system 242 contains computer executable instructions and data configured to implement various conventional operating system functions that functionally organize the media gateway controller 200. The synchronizing event services module 244 contains computer executable instructions and data configured to enable processor 220 to perform functions that include sending instructions to the media gateway to define one or more events as a synchronizing event in accordance with the present approach.

Figure 3:
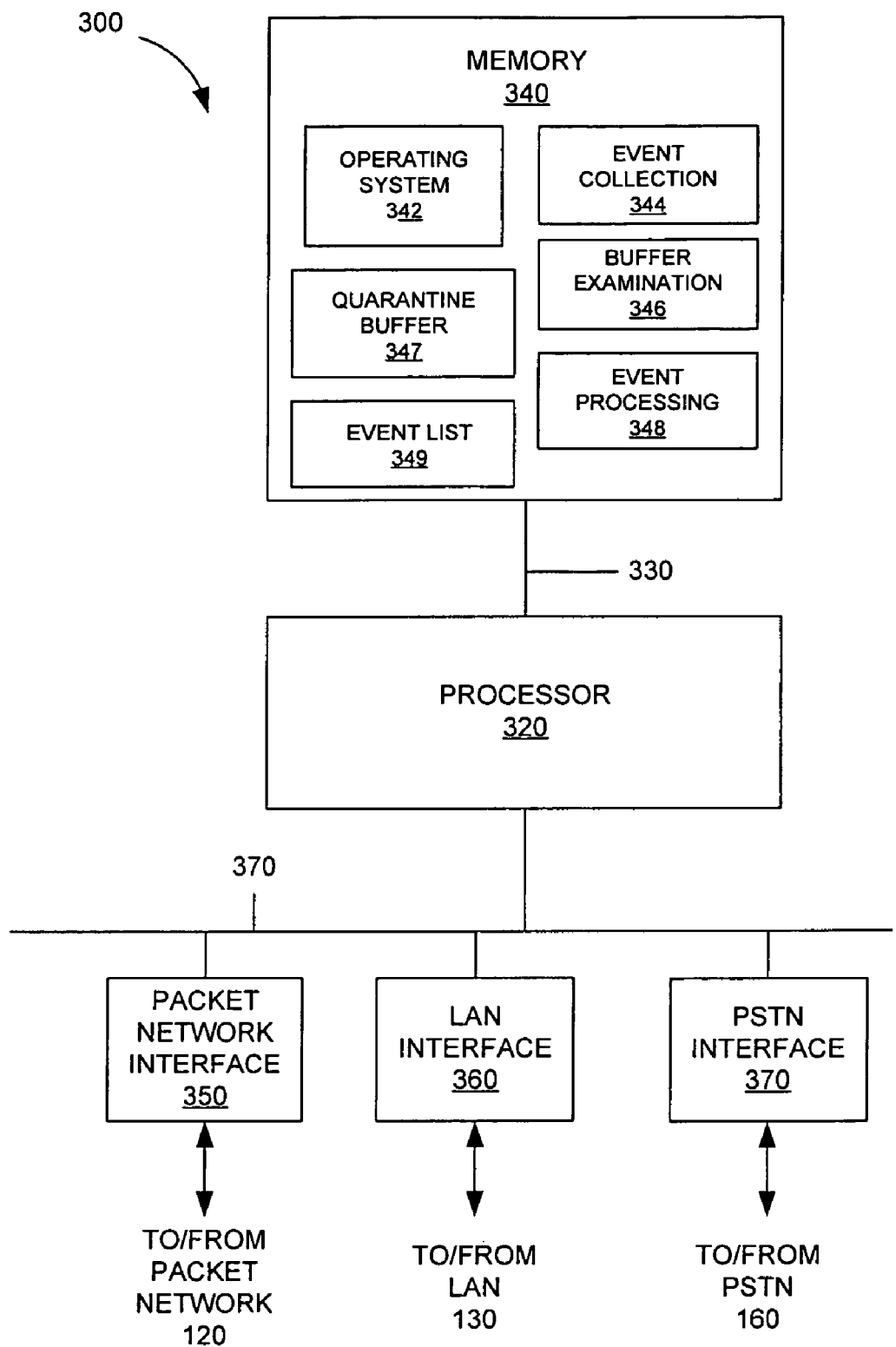
FIG. 3 is a block diagram of a media gateway that may be used with the present approach.

FIG. 3 illustrates a high-level partial schematic block diagram of an embodiment of a gateway client 300 that may be used with the present invention. The gateway 300 comprises a processor 320, memory 340 coupled to the processor 320 via memory bus 330, packet network interface module 350, LAN network interface module 360 and PSTN interface module 370 coupled to the processor 320 via I/O bus 370.

Processor 320 is configured to execute computer-executable instructions contained in memory 340 including instructions that implement aspects of the present invention. The packet network interface 350 is a conventional network interface (e.g., a network interface card) that interfaces the gateway 300 with the network 120, enabling data packets to be transferred between the gateway 300 and the network 120, and supports various protocols, such as VoIP protocols including MGCP. The LAN interface module 360 interconnects the gateway 300 with the LAN 130 and enables the gateway 300 to communicate with other components in the LAN, e.g., IP phone 150. The PSTN interface module 370 interconnects the gateway 300 with the PSTN 160 and enables the gateway 300 to communicate with other components in the PSTN. The modules 350, 360 and 370 comprise conventional interface circuitry that incorporates signal, electrical and mechanical characteristics, and interchange circuits needed to interface with the respective physical media and protocols running over that media.

Memory 340 is a computer-readable medium organized as RAM and implemented using various RAM devices, such as DRAM devices. The memory is configured to hold various computer executable instructions and data structures including computer executable instructions and data structures that implement aspects of the present approach. It should be noted that other computer readable mediums, such as disk units and flash memory, may be configured to hold computer readable instructions and data that implement aspects of the present approach. In addition, it should be noted that various electromagnetic signals may be encoded to carry instructions and data that implement aspects of the present approach on a data network.

Memory 340 includes an operating system 342, event collection routine 344, buffer examination routine 346 and event processing routine 348. The operating system 342 contains computer executable instructions and data configured to implement various conventional operating system functions that functionally organize the gateway 300. The event collection routine 344 contains computer executable instructions and data configured to enable processor 320 to perform collection of events. The buffer examination routine 346 contains computer executable instructions and data configured to enable processor 320 to examine the contents of the quarantine buffer to determine whether the collected events include one or more synchronizing events. The event processing routine 348 contains computer executable instructions and data configured to enable processor 320 to process the collected events from the quarantine buffer relative to the one or more synchronizing events in accordance with the present approach.

In addition, the memory 340 is configured to include a quarantine buffer 347 and an event list 349. The quarantine buffer 347 holds events that are detected at the gateway and await event processing. The event list 349 holds a listing of events that are taken from the quarantine buffer 347 and are either reported to the media gateway controller or discarded.

An event is defined as a synchronizing event if the occurrence of the event implies that further processing does not depend on any events that occurred prior to that event. A given event may only be synchronizing in certain cases, i.e., the property is dynamic in nature. The media gateway controller decides whether a given event is viewed as synchronizing at a given point in time by indicating this to the media gateway. For a telephone call, typically, this determination depends on the type of call and/or the current point in a pending call.

Examples of synchronizing events include on-hook, off-hook, flash-hook and quarantine buffer overflow:

On-hook—On a normal call, when an on-hook event occurs, the associated call (if there was one) is over and processing starts anew (i.e., older events are no longer of interest to the media gateway controller). Thus, events prior to this on-hook event are no longer of relevance to processing. Exceptions to this rule occur when an on-hook event does not result in call termination, e.g., in the case of a 911 call with called-party hold. The media gateway controller can adjust use of on-hook as a synchronizing event accordingly.

Off-hook—When an off-hook event occurs, it is an indication that a new call is about to be established and processing essentially starts over (i.e., older events are no longer of interest to the media gateway controller). Thus, events prior to this off-hook are no longer of relevance to processing. Exceptions to this rule occur when an off-hook event occurs on an endpoint where a call was already in progress, and that call should not be terminated as a result of an on-hook preceding this off-hook (e.g., a 911 call). The media gateway controller can adjust use of off-hook as a synchronizing event accordingly.

Flash-hook—Flash-hook may be defined as a synchronizing event under certain circumstances. Consider the case where an endpoint is involved in two calls, and uses flash-hook to switch between the two calls. A single flash-hook would result in a switch to the other call, whereas two flash-hooks would result in the same call being active (double-switch). More generally, an odd number of flashes would result in a change in the active call, whereas an even number would not. The media gateway controller may simply define flash-hook as a synchronizing event, and effectively only process the last flash-hook.

Quarantine Buffer Overflow—The quarantine buffer overflow event is generated when the quarantine buffer overflows and one or more events have been lost. This indicates an exception that should be reported to the media gateway controller as soon as possible, however the event is the last event in the quarantine buffer and hence all previous events must first be processed (which in turn can lead to additional Notify messages and further delay). By using the Quarantine Buffer Overflow event as a synchronizing event, notification of this event (as well as the rest of the quarantined and observed events) can occur in a timely manner.

As noted above, the mechanism defined herein is flexible to accommodate defining any other event, or even future event types, as synchronizing events.

We first define two new parameters to control the operation of the synchronizing events:

Synchronizing Events (SE): A match on events in this list will not trigger a Notify on the matched event.

Synchronizing Events Notify (SEN): A match on events in this list will trigger a Notify on the matched event.

An event must not be in both the SE and the SEN list.

Synchronizing events affect the processing of events in the quarantine buffer as follows. Assume the quarantine buffer contains detected events E1, E2, . . . , En, with event E1 being the oldest event. Note that if the list of Observed Events is non-empty, the list of observed events is first added to the beginning of the quarantine buffer (as usual). Furthermore, assume the media gateway controller has specified that events SE1 and SE2 are synchronizing events (by use of the SE and/or SEN lists). Normally, processing would examine the events in the quarantine buffer in First-In-First-Out (FIFO) order (i.e., starting with E1). However, we now examine the quarantine buffer in Last-In-First-Out (LIFO) order looking for the first (i.e., most recent) occurrence of an event Ej which is the same as SE1 or SE2 and which has a Notify action associated with it (either explicitly or implicitly). We then proceed with one of the following cases:

If we did not find an event Ej, we continue normal processing of the quarantine buffer as described in RFC 3435.

If found and the matched event was taken from the list SE, then we set Ei=Ej.

If found and the matched event was taken from the list SEN, we continue looking for the occurrence of an event Ei which is the same as SE1 or SE2 and which has a Notify action associated with it (either explicitly or implicitly). If found, we have two or more synchronizing events in the quarantine buffer, however we are only interested in processing of the events that occurred after Ei. If not found, we continue normal processing of the quarantine buffer as described in RFC 3435.

If we found an event Ei per the above procedures, we move all the events E1, E2, . . . , Ei, to a list called the Synchronized Event List (SEL). Events in this list are not processed but can still be reported (e.g. in the 200 response to the RQNT, and/or a new NTFY). This leaves the events Ei+1, Ei+2, . . . , En in the quarantine buffer and normal processing of the quarantine buffer now resumes, as described in RFC 3435.

Several examples may help illustrate the above defined mechanism.

Example 1

1. An off-hook is generated which results in a NTFY(off-hook)

2. An on-hook and an off-hook event is now generated resulting in a quarantine buffer containing "on-hook, off-hook". Note that the current hook-state is off-hook.

3. An "RQNT(R: on-hook, SE: off-hook, SEN: on-hook)" is now received.

4. The quarantine buffer is examined, and the event "off-hook" from the SE list is matched immediately. Consequently, we move all the events from the quarantine buffer to the Synchronized Event List.

5. Normal processing resumes. Since the quarantine buffer is empty, we simply wait for further events to be generated.

Example 2

1. An on-hook is generated which results in a NTFY(on-hook).

2. The events "off-hook", "1", "2", "3", "on-hook" now occurs resulting in a quarantine buffer with the events "off-hook, 1, 2, 3, on-hook". Note that the current hook-state is on-hook.

3. An "RQNT(R: off-hook, SE: on-hook, SEN: off-hook)" is now received.

4. The quarantine buffer is examined, and the event "on-hook" from the SE list is matched immediately. Consequently, we move all the events from the quarantine buffer to the Synchronized Event List.

5. Normal processing resumes. Since the quarantine buffer is empty, we simply wait for further events to be generated.

Example 3

In this example, we now omit the list of Requested Events and assume the on-hook and off-hook events are persistent. While the on-hook and off-hook events defined in the Line Package in RFC 3660 are not persistent, the on-hook and off-hook events defined in the Line Package in the Packet-Cable NCS specification are persistent.

1. An on-hook is generated which results in a NTFY(on-hook).

2. The events "off-hook", "1", "2", "3", "on-hook", "off-hook", "6" now occurs resulting in a quarantine buffer with the events "off-hook, 1, 2, 3, on-hook, off-hook, 6". Note that the current hook-state is off-hook.

3. An "RQNT(SE: on-hook, SEN: off-hook)" is now received.

4. The quarantine buffer is examined, and the event "off-hook" from the SEN list is matched immediately. Consequently, we look for the next synchronizing event, which is on-hook. We now move the events "off-hook, 1, 2, 3, on-hook" to the Synchronized Event List.

5. Normal processing resumes. The quarantine buffer contains the events "off-hook, 6", and as a result a NTFY (off-hook) is generated. The quarantine buffer now contains the event "6".

Note that while the foregoing has described a synchronizing mechanism that uses either the most recent synchronizing event or the second most recent synchronizing event, the principles of this approach can be extended to the $n^{th}$ latest synchronizing event.

It should be noted that MGCP defines an alternative in RFC 3435 Section 4.4.1. More specifically, when using the "loop" mode, a single Notify command can attempt to empty the quarantine buffer by reporting multiple event sets (see Section 4.4.1 for details). However, this mode of operation is not guaranteed to be supported, and it also only works when using "loop" mode. Most known implementations do not support it and furthermore, "loop" mode is generally not used ("step" mode is). The synchronizing event mechanism defined here would work for either "loop" or "step" mode, and also, by being defined in a package, support for it would be explicit and hence can be signaled deterministically between the media gateway controller and the gateway.

To further illustrate the present approach, it is helpful to review a sample call flow in more detail. First a call flow for call processing without the benefit of the present approach is examined. In the call flow below, the gateway is currently not involved in any calls. The user now rapidly lifts up the handset, puts it down, and lifts it up again in order to generate a call. Notice how there are three NTFY messages generated as a result of the three hook-events, and how enable, disable, and enable dial-tone are generated as a result of this FIFO processing:

| Step | Event | Gateway | Media gateway controller |
|---|---|---|---|
| 1 | Off-hook | => | |
| 2 | On-hook | => NTFY(off-hook) | => |
| 3 | Off-hook | => | 200 |
| | | <= | |
| 4 | | <= | RQNT(on-hook, dial-tone) |
| 5 | <= | (dial-tone) | |
| 6 | | 200 | => |
| 7 | | NTFY(on-hook) | => |
| 8 | | <= | 200 |
| 9 | (dial-tone stops) | <= | RQNT(off-hook) |
| 10 | | 200 | => |
| 11 | | NTFY(off-hook) | => |
| 12 | | <= | 200 |
| 13 | | <= | RQNT(on-hook, dial-tone) |
| 14 | | 200 | => |
| 15 | <= | (dial-tone) | |
| 16 | digit input | => | |
| 17 | | NTFY (digits) | => |
| 18 | | <= | 200 |
| 19 | | <= | CRCX + RQNT(on-hook) |
| 20 | | 200 | => |
| 21 | | | ... |
| 22 | | <= | MDCX |
| 23 | | 200 | => |
| 24 | | (Call in progress) | |
| 25 | On-hook | => | |
| 26 | | NTFY(on-hook) | => |
| 27 | | <= | 200 |
| 28 | | <= | DLCX |
| 29 | | 200 | => |
| 30 | | <= | RQNT(off-hook) |
| 31 | | 200 | => |

Steps of interest here include:
Step 1: An off-hook event is generated.
Step 2: The off-hook event is notified to the media gateway controller while, an on-hook event is generated and added to the quarantine buffer.
Step 3: An off-hook event is generated and added to the quarantine buffer.
Step 4: An RQNT is received instructing the gateway to generate dial-tone look for on-hook (and digits).
Step 5: Dial-tone is generated
Step 7: As a result of the RQNT, the quarantine buffer is processed and the hook event results in generation of a NTFY.
Step 9: The media gateway controller instructs the gateway to look for off-events. Dial-tone is furthermore stopped as a result of this RQNT.
Step 11: As a result of the RQNT, the quarantine buffer is processed and the hook event results in generation of a NTFY.
Step 13: An RQNT is received instructing the gateway to generate dial-tone and look for on-hook (and digits).
Step 15: Dial-tone is generated. The rest of the call flow continues as normal.

In contrast, a complete call flow utilizing the mechanism according to the present approach is now examined. In the following call flow, again the gateway is currently not involved in any calls. The user now rapidly lifts up the handset, puts it down, and lifts it up again in order to generate a call. However, this time on-hook and off-hook events are defined as synchronizing events. Notice how only a single NTFY message is generated as a result of these events (and the system still can use "step" mode):

| Step | Event | Gateway | Media gateway controller |
|---|---|---|---|
| 1 | Off-hook | => | |
| 2 | On-hook | => NTFY(off-hook) | => |
| 3 | Off-hook | => | 200 |
| | | <= | |
| 4 | | <= | RQNT(on-hook, dial-tone, SE: off-hook, SEN: on-hook) |
| 5 | <= | (dial-tone) | |
| 6 | | 200 | => |
| 7 | digit input | => | |
| 8 | | NTFY(digits) | => |
| 9 | | <= | 200 |
| 10 | | <= | CRCX + RQNT(on-hook, SE: off-hook, SEN: on-hook) |
| 11 | | 200 | => |
| 12 | | | ... |
| 13 | | <= | MDCX |
| 14 | | 200 | => |
| 15 | | (call in progress) | |
| 16 | On-hook | => | |
| 17 | | NTFY(on-hook) | => |
| 18 | | <= | 200 |
| 19 | | <= | DLCX |
| 20 | | 200 | => |
| 21 | | <= | RQNT(off-hook) |
| 22 | | 200 | => |

Steps of interest here include:
Step 1: The user picks up the phone which in turn generates an off-hook event.
Step 2: The off-hook event is notified to the media gateway controller. Meanwhile, an on-hook event is generated and added to the quarantine buffer.
Step 3: An off-hook event is generated and added to the quarantine buffer.
Step 4: An RQNT is received instructing the gateway to generate dial-tone and look for on-hook (and digits). The RQNT specifies on-hook and off-hook as synchronizing events—the on-hook event should generate a Notify whereas the off-hook should not. As a result, the quarantine buffer is simply emptied (on-hook and off-hook moved to the Synchronized Event List) and processing continues as usual.
Step 5: Dial-tone is generated. The rest of the flow continues as normal.

Figure 4:
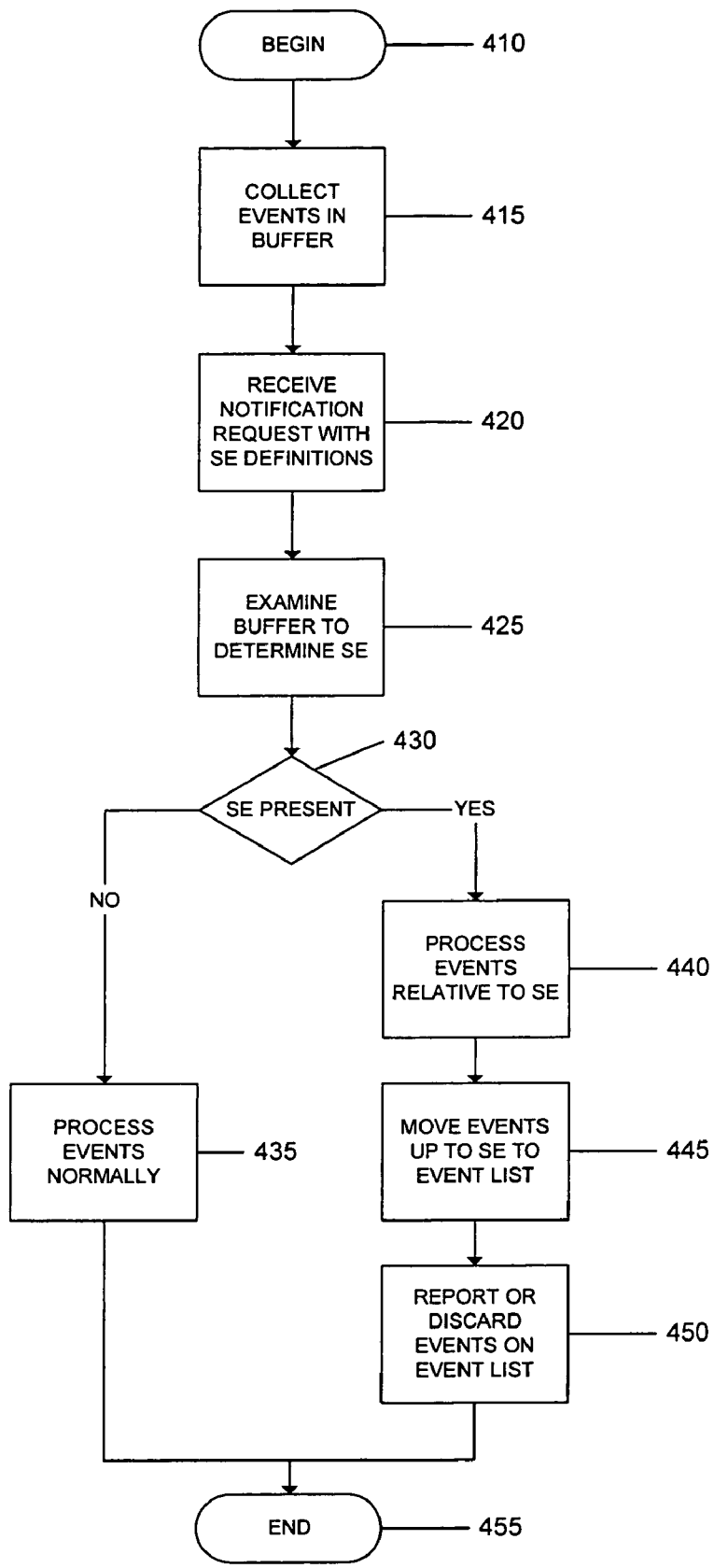
FIG. 4 is a diagram that illustrates a process flow that may be used by a media gateway in accordance with the present approach.

FIG. 4 is a diagram that illustrates a process flow that may be used by a media gateway according to the present approach.

At the start 410, events are collected 415 by the gateway in a quarantine buffer. An instruction signal, e.g., a Notification-Request (RQNT) command, is received 420 from the media gateway controller, defining one or more events as a synchronizing event. At 425, the buffer is examined to determine whether the collected events include one or more of the synchronizing events. If at 430 there is not any synchronizing event present in the buffer, then the gateway performs normal processing, e.g., first-in-first-out processing, of the collected events and the process concludes at 455.

If one or more synchronizing events is detected at 430, then the processing of the collected events is performed relative to the synchronizing events 440. For example, processing of the events from the quarantine buffer may begin after the most recent synchronizing event. At 445, the collected events not processed, e.g., those events that occurred up to the most recent synchronizing event, are moved to a synchronized event list. The events on the synchronized event list may be reported to the media gateway controller or discarded at 450 and the process concludes at 455.

The mechanism for synchronization event designation and processing of the present approach can be applied to configurations relating to failover of the primary media gateway controller to a backup media gateway controller. In that case, by the time the gateway is able to re-establish a connection with the backup media gateway controller, there may be stale events accumulated in the quarantine buffer at the gateway. Applying the mechanism of synchronization event designation and processing as described herein provides a quick way to synchronize the states between the gateway and the backup media gateway controller.

Consider a scenario where a media gateway is controlled by a primary media gateway controller (MGC-1) and a backup media gateway controller (MGC-2). For example, MGC-1, MGC-2 may correspond respectively to media gateway controllers 200A, 200B as shown in FIG. 1. During normal operation, the gateway sends Notify commands to MGC-1, and event processing operates as normal. If MGC-1 fails, the gateway will first transmit, and then retransmit commands to MGC-1. If no response is received, the gateway will go disconnected (as described in RFC 3435) and start sending periodic RestartInProgress messages to MGC-1. While this occurs, events are being accumulated in the quarantine buffer. At some point, MGC-2 takes over for MGC-1. Note that MGC-2 is likely to be taking over a lot of endpoints from MGC-1, and hence efficient processing is now important in order to restore service quickly. The longer the gateway was unable to communicate with MGC-1, the higher the likelihood that stale events have been accumulated in the quarantine buffer. Processing of those stale events will involve multiple messages being exchanged, which potentially leads to confusing service (e.g., dial tone being turned on and off), additional delay, and more processing required by the MGC-2 at a critical point in time where potentially lots of endpoints need to have service restored at the same time. By using synchronizing events, these drawbacks can be avoided. This is illustrated in the call flow below, where we assume that the gateway detects the failure of MGC-1 and automatically switches to MGC-2 (e.g., using the DNS failover procedures defined in RFC 3435)—note that this is just one example and other primary/backup scenarios (e.g., MGC-2 actively taking over for MGC-1 and informing the gateway about this) are possible:

| Step | Event | Gateway | MGC-1 | MGC-2 |
|---|---|---|---|---|
| 1 | Off-hook | => | | |
| 2 | | NTFY(off-hook) | => | |
| 3 | | | (MGC-1 crashes) | |
| 4 | | retransmit NTFY(off-hook) | => | |
| 5 | On-hook | => | | |
| 6 | Off-hook | => | | |
| 7 | | retransmit NTFY(off-hook) | => | |
| 8 | | | (switch to MGC-2) | |
| 9 | On-hook | => | | |
| 10 | Off-hook | => | | |
| 11 | | retransmit NTFY(off-hook) | === | => |

-continued

| Step | Event | Gateway | MGC-1 | MGC-2 |
|---|---|---|---|---|
| 12 | | <= | === | 200 |
| 13 | | <= | | RQNT(on-hook, dial-tone, SE: off-hook, SEN: on-hook) |
| 14 | <= | (dial-tone) | | |
| 15 | | 200 | === | => |
| 16 | digit input | => | | |
| 17 | | ... | | |

Steps of interest here include:

Step 1-2: An off-hook event is generated and a Notify(off-hook) message is sent to the MGC-1.

Step 3: MGC-1 crashes and hence a response is not sent back to the gateway.

Step 4: The message sent in step 2 has not yet received a response and hence a retransmission to MGC-1 now occurs.

Step 5-6: User does not receive any dial-tone and hence goes on-hook and off-hook.

Step 7: There is still no response to the message sent earlier and hence another retransmission to MGC-1 occurs.

Step 8: Still no response from MGC-1, so the gateway switches to the backup MGC-2.

Step 9-10: User has still not received dial-tone and hence goes on-hook and off-hook again.

Step 11: Message is now sent to the backup MGC-2.

Step 12: Message is acknowledged by MGC-2.

Step 13: MGC-2 sends down a NotificationRequest to the gateway looking for on-hook, instructing the gateway to generate dial-tone, and indicates that on-hook and off-hook are synchronizing events; on-hook as a synchronizing event should generate a Notify whereas the off-hook should not. The MGC-2 would also instructs the gateway to collect DTMF digits.

When the gateway receives this request, it's quarantine buffer contains the events "on-hook, off-hook, on-hook, off-hook". Had we not used synchronizing events, four sets of Notify messages and new RQNTs would have to be exchanged and processed before service would be restored. However, with the use of synchronizing events, the MG notes that off-hook was the last synchronizing event and hence does not process the old stale events. Instead, it proceeds directly to collect DTMF digits and service is restored.

Step 14: Dial-tone is played and the call flow continues as usual.

While the description of embodiments has referred to MGCP, it should be understood that the principles of the present approach may be extended to other signaling protocols, including Megaco/H.248 and Session Initiation Protocol (SIP). In the case of Megaco/H.248, use of the approach is straightforward as the event processing is substantially similar to MGCP. In the case of SIP, the approach could for example be applicable to use of the "Session Initiation Protocol (SIP) Event Package for Key Press Stimulus (KPML)". KPML currently only defines DTMF events; however, it has an event processing model which including includes buffering of events that is similar to that described above and hence the concept of synchronizing events can be applied herein as well (especially if KPML is extended to cover other events, e.g., on-hook and off-hook events, which e.g. could be useful for certain operator services). In general, the principles of the present approach can be extended to any protocols that uses an event processing model similar to that described above.

It should be noted that functions performed by embodiments that implement aspects of the present invention, may be implemented in whole or in part using some combination of hardware and/or software. It should be further noted that computer-executable instructions and/or computer data that implement aspects of the present invention may be stored in other computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a data network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communication processing at a client connected to a server, the method comprising:
    collecting events in a quarantine buffer;
    examining contents of the quarantine buffer to determine whether the collected events include one or more synchronizing events, each synchronizing event providing a synchronization point for event processing; and
    if the collected events include one or more synchronizing events, processing events collected after said one or more synchronizing events.

2. The method of claim 1 further including moving the collected events that occurred up to a $n^{th}$-latest synchronizing event to a synchronized event list, n being a positive integer.

3. The method of claim 2 further including reporting the synchronized event list to the server.

4. The method of claim 2 further including discarding the events on the synchronized event list.

5. The method of claim 1 further comprising receiving an instruction signal from the server, the instruction signal including information defining one or more events as a synchronizing event.

6. The method of claim 5 wherein the instruction signal is an MGCP NotificationRequest command modified to include one or more parameters defining the synchronizing events.

7. The method of claim 1 wherein the synchronizing events include on-hook events, off-hook events, flash-hook events and buffer overflow events.

8. The method of claim 1 wherein the client is a media gateway or media termination adapter and the server is a media gateway controller in a VoIP network.

9. A method of communication processing at a media gateway connected over a VoIP network to a media gateway controller, the method comprising:
    collecting events in a quarantine buffer;
    receiving an instruction signal from the media gateway controller, the instruction signal including information defining one or more events as a synchronizing event, each synchronizing event providing a synchronization point for event processing;
    examining contents of the quarantine buffer to determine whether the collected events include one or more synchronizing events; and
    if the collected events include one or more synchronizing events, processing events collected said one or more synchronizing events.

10. The method of claim 9 further including moving the collected events that occurred up to a $n^{th}$-latest synchronizing event to a synchronized event list, n being a positive integer.

11. The method of claim 10 further including reporting the synchronized event list to the server.

12. The method of claim 10 further including discarding the events on the synchronized event list.

13. The method of claim 9 wherein the instruction signal is an MGCP NotificationRequest command modified to include one or more parameters defining the synchronizing events.

14. The method of claim 9 wherein the synchronizing events include on-hook events, off-hook events, flash-hook events and quarantine buffer overflow events.

15. Apparatus for communication processing at a client connected to a server, the apparatus comprising:
    means for collecting events in a quarantine buffer;
    means for examining contents of the quarantine buffer to determine whether the collected events include one or more synchronizing events, each synchronizing event providing a synchronization point for event processing; and
    means for processing the events collected after said one or more synchronizing events.

16. A client for communicating over a network to a server assigned to the client, the client comprising:
    a quarantine buffer;
    a collecting routine for collecting events in the quarantine buffer;
    a buffer examination routine for examining contents of the quarantine buffer to determine whether the collected events include one or more synchronizing events, each synchronizing event providing a synchronization point for event processing; and
    an event processing routine for processing events collected after said one or more synchronizing events.

17. The client of claim 16 wherein the client is a media gateway or media termination adapter and the server is a media gateway controller in a VoIP network.

18. A communication system comprising:
    a media gateway controller sending an instruction signal defining one or more events as a synchronizing event;
    a media gateway connected to the media gateway controller over a VoIP network, the media gateway comprising:
    a quarantine buffer;
    a collecting routine for collecting events in the quarantine buffer;
    a buffer examination routine for examining contents of the quarantine buffer to determine whether the collected events include one or more synchronizing events as defined by the instruction signal received from the media gateway controller, each synchronizing event providing a synchronization point for event processing; and
    an event processing routine for processing events collected after said one or more synchronizing events.

19. A method of communication processing between a media gateway connected over a VoIP network to a media gateway controller, the method comprising:
    at a media gateway controller, sending an instruction signal defining one or more events as a synchronizing event, each synchronizing event providing a synchronization point for event processing;
    at a media gateway,
    collecting events in a quarantine buffer;

receiving the instruction signal from the media gateway controller;

examining contents of the quarantine buffer to determine whether the collected events include one or more synchronizing events; and if the collected events include one or more synchronizing events, processing events collected after said one or more synchronizing events.

* * * * *

UNITED STATES PATENT AND TRADEMARK OFFICE
CERTIFICATE OF CORRECTION

| | | |
|---|---|---|
| PATENT NO. | : 7,899,040 B2 | Page 1 of 1 |
| APPLICATION NO. | : 11/376657 | |
| DATED | : March 1, 2011 | |
| INVENTOR(S) | : Flemming Andreasen | |

It is certified that error appears in the above-identified patent and that said Letters Patent is hereby corrected as shown below:

IN THE CLAIMS:

Column 14, Claim 15, line 25, delete "the".

Signed and Sealed this

Nineteenth Day of April, 2011

David J. Kappos
*Director of the United States Patent and Trademark Office*